(12) United States Patent
Grant et al.

(10) Patent No.: US 10,591,159 B2
(45) Date of Patent: Mar. 17, 2020

(54) METHOD FOR GENERATING OR RECOVERING MATERIALS THROUGH SMOLDERING COMBUSTION

(71) Applicant: Geosyntec Consultants, Inc., Boca Raton, FL (US)

(72) Inventors: Gavin Grant, Etabicoke (CA); David Major, Guelph (CA); Grant Scholes, Guelph (CA); Jason Gerhard, London (CA); Joshua Brown, London (CA); Jose Torero, Washington, DC (US); Tarek Rashwan, London (CA)

(73) Assignee: Geosyntec Consultants, Inc., Boca Raton, FL (US)

( * ) Notice: Subject to any disclaimer, the term of this patent is extended or adjusted under 35 U.S.C. 154(b) by 221 days.

(21) Appl. No.: 15/490,415

(22) Filed: Apr. 18, 2017

(65) Prior Publication Data

US 2017/0299175 A1    Oct. 19, 2017

Related U.S. Application Data

(60) Provisional application No. 62/324,590, filed on Apr. 19, 2016.

(51) Int. Cl.
*B09B 3/00* (2006.01)
*B09C 1/08* (2006.01)
(Continued)

(52) U.S. Cl.
CPC ............ *F23G 5/027* (2013.01); *B01D 53/86* (2013.01); *B01J 37/14* (2013.01); *B09B 3/0083* (2013.01);
(Continued)

(58) Field of Classification Search
CPC ... F23G 5/027; F23G 7/00; F23G 7/07; C01B 3/32; B09C 1/06; B09C 1/065;
(Continued)

(56) References Cited

U.S. PATENT DOCUMENTS

| 1,690,444 | A | * | 11/1928 | Dobbelstein | ............ F26B 17/32 34/109 |
| 2,993,454 | A | * | 7/1961 | Hebert | ...................... F23M 9/06 110/211 |

(Continued)

FOREIGN PATENT DOCUMENTS

DE        20 20 612 A1    12/1971
WO    WO 2014/074295 A1    5/2014
(Continued)

OTHER PUBLICATIONS

Authorized Officer: Tassinari, Francesca, Notification of Transmittal of the International Search Report and the Written Opinion of the International Searching Authority, or the Declaration; PCT/US2017/028134, 14 pages, dated Jul. 28, 2017.

*Primary Examiner* — Benjamin F Fiorello
*Assistant Examiner* — Edwin J Toledo-Duran
(74) *Attorney, Agent, or Firm* — Sunstein Kann Murphy & Timbers LLP

(57) ABSTRACT

Methods are provided for generating or recovering gaseous materials such as hydrogen and solids such as metals through the smoldering combustion of an organic material. The methods include admixing a porous matrix material with an organic material, and, in some embodiments a catalyst, to produce a porous mixture. The mixture is exposed to an oxidant, initiating a self-sustaining smoldering combustion of the mixture, and collecting the vapors and combustion products or processing the porous matrix following combustion to physically separate the porous matrix material from ash containing inorganic materials of value.

(Continued)

Additional embodiments aggregate the organic material or catalyst or porous matrix material or mixture thereof in an impoundment such as a reaction vessel, lagoon or matrix pile. Further embodiments utilize at least one heater to initiate combustion and at least one air supply port to supply oxidant to initiate and maintain combustion.

15 Claims, 17 Drawing Sheets

(51) Int. Cl.
| | |
|---|---|
| *F23G 5/027* | (2006.01) |
| *B01J 37/14* | (2006.01) |
| *C10J 3/02* | (2006.01) |
| *B01D 53/86* | (2006.01) |
| *C22B 7/00* | (2006.01) |
| *B09C 1/06* | (2006.01) |
| *F23G 7/00* | (2006.01) |
| *F23G 7/07* | (2006.01) |
| *C01B 3/32* | (2006.01) |

(52) U.S. Cl.
CPC ............ *B09C 1/06* (2013.01); *B09C 1/065* (2013.01); *C01B 3/32* (2013.01); *C10J 3/02* (2013.01); *C22B 7/00* (2013.01); *F23G 7/00* (2013.01); *F23G 7/07* (2013.01); C10J 2300/0916 (2013.01); C10J 2300/0946 (2013.01); C10J 2300/0956 (2013.01); C10J 2300/0986 (2013.01); Y02P 20/145 (2015.11)

(58) Field of Classification Search
CPC ......... C22B 7/00; B09B 3/0083; B01D 53/86; B01J 37/14; C10J 3/02; C10J 2300/0916; C10J 2300/0946; C10J 2300/0956; C10J 2300/0986; Y02P 20/145
USPC ... 405/128.1, 128.15, 128.7, 128.85, 128.45, 405/128.6; 175/66; 110/188, 191, 229, 110/348, 346
See application file for complete search history.

(56) References Cited

U.S. PATENT DOCUMENTS

| | | | | |
|---|---|---|---|---|
| 4,077,777 | A * | 3/1978 | Henke | B01D 53/48 175/206 |
| 5,050,511 | A * | 9/1991 | Hallett | A62D 3/37 110/215 |
| 6,058,856 | A * | 5/2000 | Okusawa | B01B 1/005 110/233 |
| 6,513,602 | B1 * | 2/2003 | Lewis | A62C 5/006 149/19.1 |
| 6,987,792 | B2 * | 1/2006 | Do | C10J 3/18 110/346 |
| 9,168,409 | B2 * | 10/2015 | Thomas | A62D 3/40 |
| 10,137,486 | B1 * | 11/2018 | Kamath | B09C 1/06 |
| 2002/0069798 | A1 * | 6/2002 | Aguadas Ellis | C10J 3/06 110/229 |
| 2003/0110994 | A1 * | 6/2003 | Lissianski | F23L 9/04 110/345 |
| 2004/0228688 | A1 * | 11/2004 | Stegemeier | B09C 1/00 405/128.4 |
| 2004/0228689 | A1 * | 11/2004 | Stegemeier | B09C 1/00 405/128.35 |
| 2004/0228690 | A1 * | 11/2004 | Stegemeier | B09C 1/00 405/128.45 |
| 2006/0065172 | A1 * | 3/2006 | Capote | B09B 3/005 110/250 |
| 2008/0008639 | A1 * | 1/2008 | Sakurai | B01D 53/864 423/230 |
| 2009/0038811 | A1 * | 2/2009 | Wagner | A62C 99/0018 169/46 |
| 2011/0061577 | A1 * | 3/2011 | Lo | F23G 5/027 110/235 |
| 2011/0303134 | A1 * | 12/2011 | Lim | C10J 3/66 110/235 |
| 2012/0272878 | A1 * | 11/2012 | Grant | F23G 7/05 110/346 |
| 2013/0333288 | A1 * | 12/2013 | Richley | C10K 3/003 48/113 |
| 2015/0010359 | A1 * | 1/2015 | Geckeler | E02D 3/11 405/128.85 |
| 2015/0259603 | A1 * | 9/2015 | Hallowell | C10B 7/10 202/93 |

FOREIGN PATENT DOCUMENTS

| | | | | |
|---|---|---|---|---|
| WO | WO-2014074295 | A1 * | 5/2014 | ............ A62D 3/40 |
| WO | WO 2014/093469 | A2 | 6/2014 | |

* cited by examiner

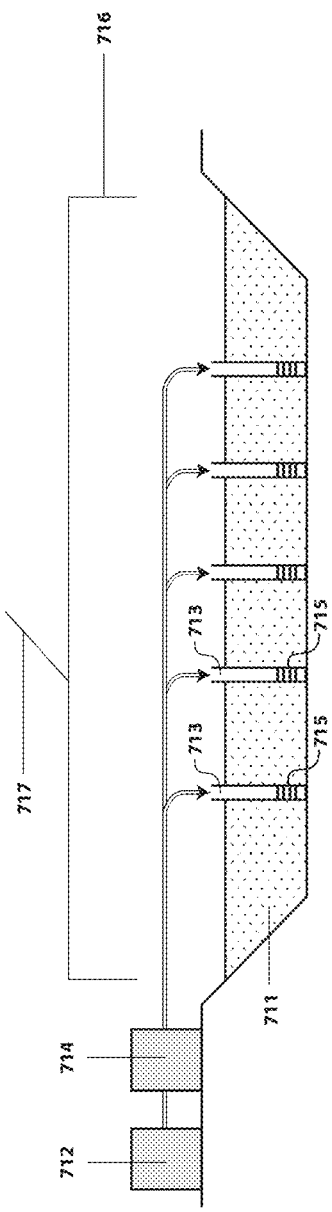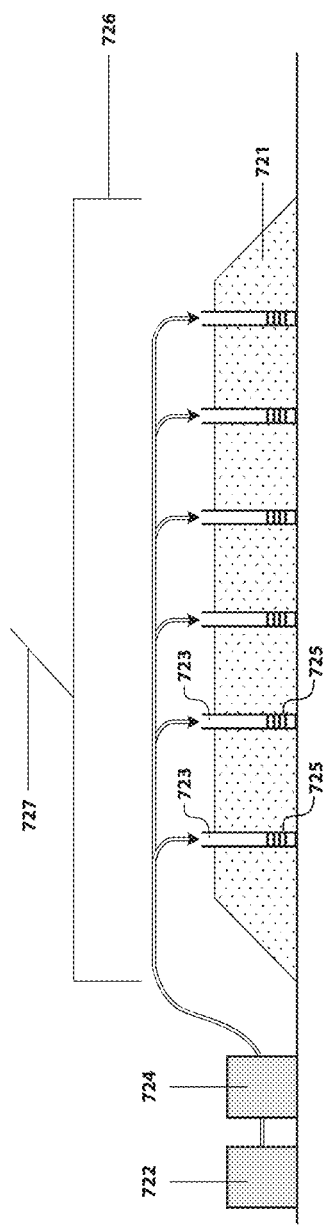

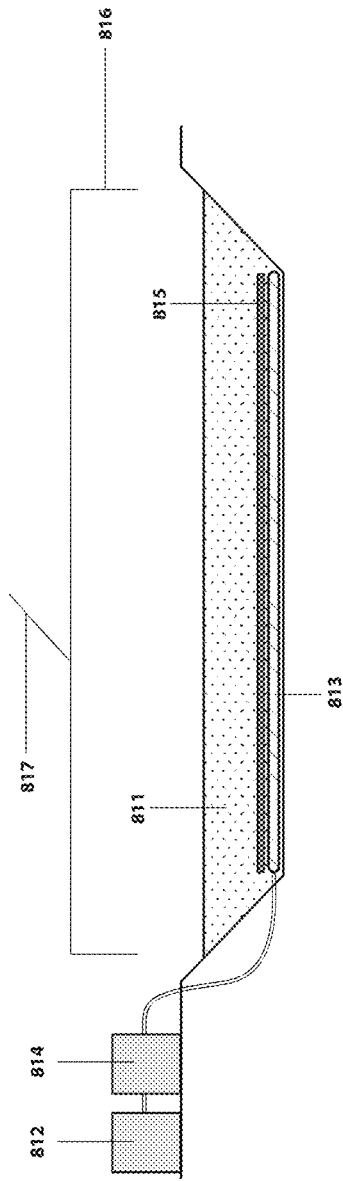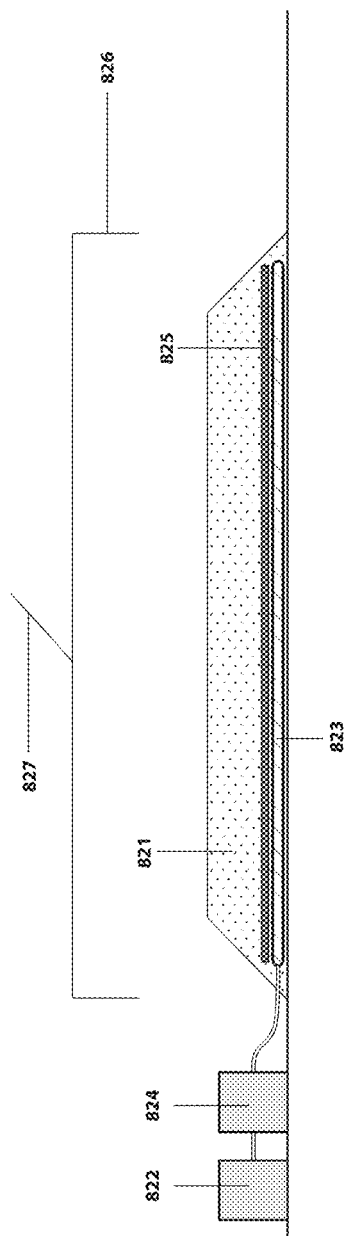

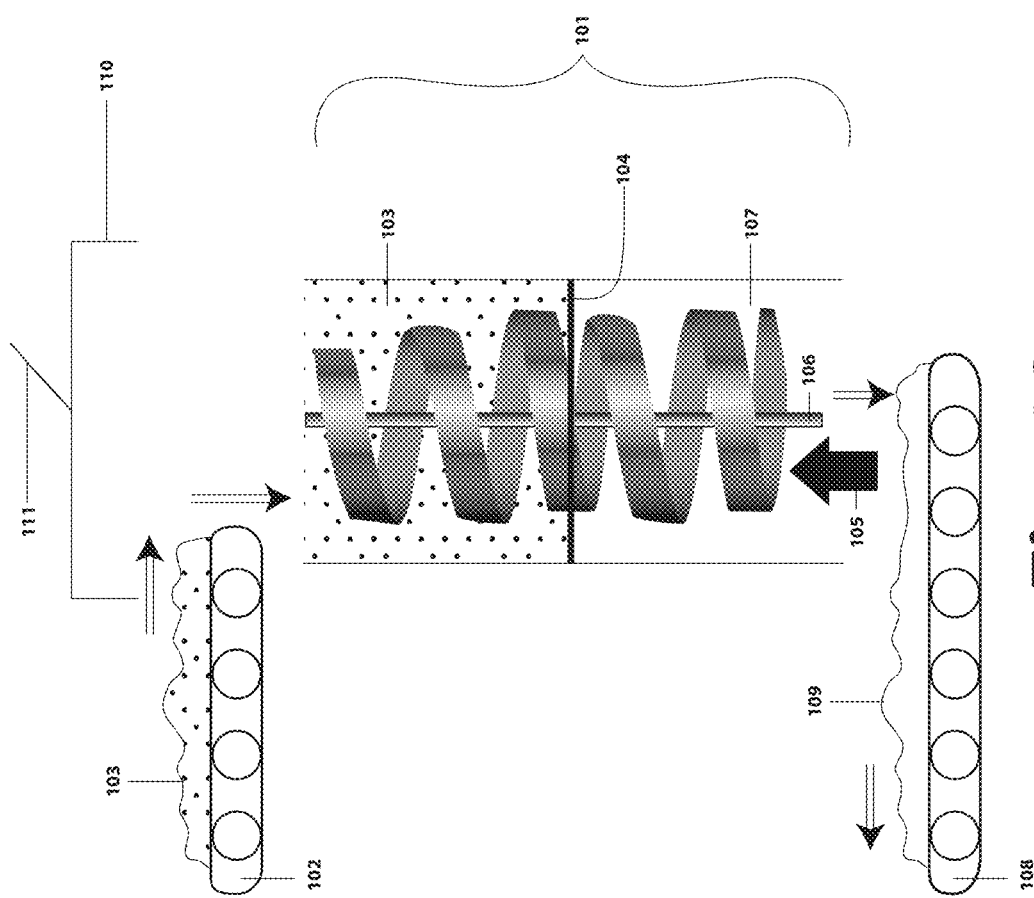

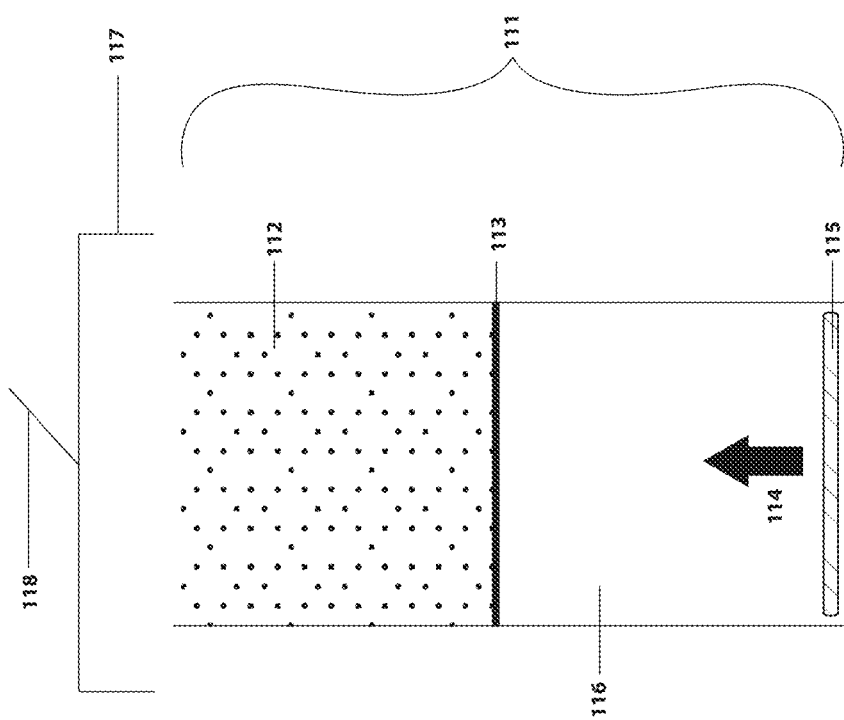

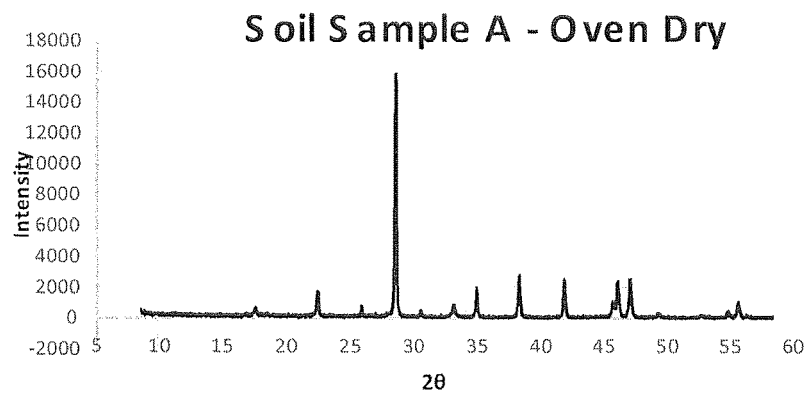
Fig. 12A
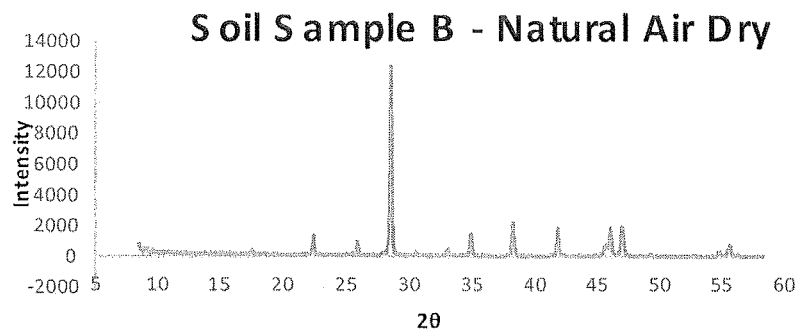
Fig. 12B
Fig. 12C
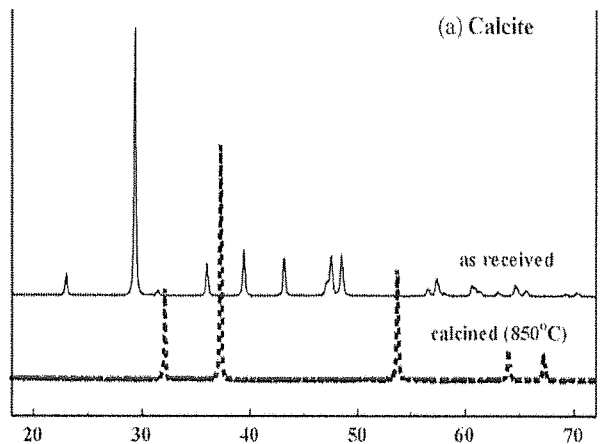

| AIR - GC VOA-D1946-% V/V | Result | Q | % V/V MDL |
|---|---|---|---|
| AIR BY D1946 | | | |
| Carbon Dioxide (TCD) | 11 | | 0.033 |
| Carbon monoxide | 1.4 | | 0.0031 |
| Ethane | 0.14 | | 0.000033 |
| Ethylene | 0.058 | | 0.000035 |
| Hydrogen | 3.8 | | 0.0089 |
| Methane (FID) | NR | | |
| Oxygen | 8.4 | B | 0.023 |
| Propane | 0.034 | | 0.000036 |
| Propene | 0.042 | | 0.000033 |

Fig. 15

METHOD FOR GENERATING OR RECOVERING MATERIALS THROUGH SMOLDERING COMBUSTION

CROSS-REFERENCE TO RELATED APPLICATIONS

This patent application claims the benefit of U.S. Provisional Patent Application No. 62/324,590 filed Apr. 19, 2016, the disclosure of which is incorporated by reference herein in its entirety.

TECHNICAL FIELD

The present application relates to methods for producing or recovering materials through the smoldering combustion of organic materials, including the smoldering combustion of organic liquids embedded within or mixed with a porous matrix. The methods can generate gaseous products, such as hydrogen, and solid products such as metals.

BACKGROUND ART

Recent advances in the field of combustion science have demonstrated that organic liquids can be smoldered. When smoldering combustion is applied for the remediation of contaminated soils it is known commercially as the Self-sustaining Treatment for Active Remediation (STAR) technology, which is the subject of U.S. Pat. No. 8,132,987.

Usually, smoldering combustion requires a short duration energy input, and the addition of an oxidant (e.g., oxygen or air) to initiate and sustain the smoldering combustion reaction. An example of a smoldering combustion reaction is that of a burning charcoal briquette. Smoldering combustion is normally only possible in the presence of a fuel source and a porous matrix. In the case of a charcoal briquette, the charcoal is both the fuel and the porous matrix; whereas for the STAR process, the fuel is an organic contaminant and the porous matrix is the subterranean volume of soil.

In the field of hydrogen production, there are many techniques available for the generation of hydrogen and these techniques are commonly grouped into methods that derive hydrogen from hydrocarbon fuels or from water. Of the methods that derive hydrogen from hydrocarbon fuels, steam reforming is the most common. Steam reforming involves the reaction of a hydrocarbon fuel with steam at high temperature (typically 700 to 1100 degrees Celsius) in the presence of a catalyst. Usually, in this process, steam reacts with methane in the presence of a nickel catalyst to yield carbon monoxide and hydrogen, and additional hydrogen can be recovered by a lower-temperature gas-shift reaction with the carbon monoxide in the presence of a copper or iron catalyst. The first reaction is strongly endothermic while the second reaction is mildly exothermic; thus, the first, high-temperature reaction requires the input of significant heat energy into the system for the process to proceed.

Smoldering combustion of organic fuels such as hydrocarbons is usually an exothermic reaction (net energy producing) that can be established with only a short duration, low-input of localized energy and then operates in a self-sustaining manner; in essence, the energy for the smoldering of the hydrocarbon fuels primarily comes from the inherent energy within the fuel themselves.

In addition, once smoldered, non-combustible materials within the organic fuels will remain as ash. The ash may include metals or phosphorus-containing compounds in concentrations of economic value. Recent studies have determined that biosolids—semi-solid organic materials from the treatment of sewage in waste water treatment plants—may contain metals and other materials such as phosphorus compounds that may be recovered if only they can be separated or removed from the organic material in which they reside.

One current method for separating inorganic materials of value from biosolids or other combustible materials is through the incineration of these materials and subsequent recovery of the inorganic materials from the ashes. Incineration, however, uses external fuel to drive the destruction of organic materials, thereby making the process more costly and less competitive from an economic perspective.

SUMMARY OF THE EMBODIMENTS

In a first aspect, a method is provided for producing and collecting at least one gas through smoldering combustion of an organic material, for example an organic liquid, semi-solid, slurry, or solid, in the presence of a catalyst. The method includes: providing a mixture of the organic material, a porous matrix, and at least one catalyst; heating a portion of the mixture; exposing the mixture to at least one oxidant so as to initiate self-sustaining smoldering combustion of the mixture to cause the production of the at least one gas; and collecting the at least one gas. Example product gases include hydrogen, benzene, toluene, ethylbenzene, or xylene. Exposing the mixture to least one oxidant may include injecting air into the mixture through one or a plurality of injection ports. In exemplary embodiments, the air flows through the mixture at a linear velocity of between 0.0001 and 100 centimetres per second. The air or other gaseous oxidants may be aspirated through the mixture by applying a vacuum.

Smoldering combustion may be initiated by applying heat to the mixture from at least one internal conductive heating source in direct contact with the mixture. Smoldering combustion may also be initiated by applying heat to the mixture from at least one convective heating source coupled to the mixture. The convective heating source may be external to the mixture or located within the mixture. Initiating the smoldering combustion may include applying radiative heat to the mixture. The material of the porous matrix material may be selected from the group consisting of sand, gravel, crushed stone, glass, ceramics, zeolite, woodchips, and combinations thereof. The smoldering combustion may be carried out at a temperature within a range between 200 and 2000 degrees Celsius. The catalyst may be selected from the group consisting of: calcium oxides and calcium carbonates, proton acids, multifunctional solids, and transition metals including synthesized or naturally occurring metals such as silver, aluminum, arsenic, gold, boron, barium, beryllium, bismuth, cadmium, cerium, cobalt, chromium, cesium, copper, iron, germanium, hafnium, mercury, indium, potassium, lanthanum, lithium, magnesium, manganese, molybdenum, sodium, niobium, nickel, phosphorus, lead, palladium, platinum, rubidium, rhenium, sulfur, antimony, scandium, selenium, tin, strontium, tantalum, tellurium, thorium, titanium, thallium, uranium, vanadium, tungsten, yttrium, zinc, and zirconium in all their forms and oxidative states, and combinations thereof.

The method may further include admixing an organic material with the at least one catalyst. Also, the method may further include aggregating the porous matrix and the catalyst in a reaction vessel, pile or lagoon. The mixture may be aggregated in a reaction vessel, pile, or lagoon, and forming the mixture may include batch-feeding of the organic liquid into a vessel. A mixing tool may be used to admix the organic liquid with the catalyst and the porous matrix to produce the mixture. The mixture may be provided by forming a permanent or semi-permanent confinement bed comprising the porous matrix, and continuously pouring organic liquid into the confinement bed. The porous matrix may be admixed with the catalyst and the organic liquid using a helical mixing tool to produce the mixture which is supplied to the zone of smoldering combustion via a first conveyor system, and the resulting porous matrix and catalyst may be removed via a second conveyor system. The organic liquid may be aggregated above ground level or below ground level, and may be an emulsion or a slurry.

In a second aspect, a method is provided for producing and collecting hydrogen gas through smoldering combustion of an organic material in the presence of a catalyst. The method includes: providing a mixture of the organic material and at least one catalyst; heating a portion of the mixture; exposing the mixture to at least one oxidant so as to initiate self-sustaining smoldering combustion of the mixture to cause the production of hydrogen gas; and collecting hydrogen gas. Exposing the mixture to least one oxidant may include injecting air into the mixture through one or a plurality of injection ports. In exemplary embodiments, the air flows through the mixture at a linear velocity of between 0.0001 and 100 centimetres per second. The air or other gaseous oxidants may be aspirated through the mixture by applying a vacuum.

Smoldering combustion may be initiated by applying heat to the mixture from at least one internal conductive heating source in direct contact with the mixture. Smoldering combustion may also be initiated by applying heat to the mixture from at least one convective heating source coupled to the mixture. The convective heating source may be external to the mixture or located within the mixture. Initiating the smoldering combustion may include applying radiative heat to the mixture. The material of the porous matrix material may be selected from the group consisting of sand, gravel, crushed stone, glass, ceramics, zeolite, woodchips, and combinations thereof. The smoldering combustion may be carried out at a temperature within a range between 200 and 2000 degrees Celsius.

The method may further include admixing a porous matrix material with at least one catalyst to provide the mixture. The method may also include admixing a porous matrix material with the organic material. Propagation of the combustion may be cause to take place away from a point of ignition of the combustion. The porous matrix and the catalyst may be aggregated in a reaction vessel. The porous matrix, the catalyst, and the organic material may be aggregated in a reaction vessel. The organic material and the catalyst may be aggregated in a pile. The porous matrix, catalyst, and the organic material may be aggregated in a pile. The organic material and catalyst may be aggregated in a lagoon. The porous matrix, catalyst, and the organic material may be aggregated in a lagoon. The mixture may be continuously fed into a zone of smoldering combustion. Providing the mixture may include batch-feeding of the organic material and catalyst into a vessel. A mixing tool may be used to admix the organic material with the catalyst to produce the mixture, and the mixing tool may include a rotating helical blade. Providing the mixture may include forming a permanent or semi-permanent confinement bed comprising the porous matrix material; and continuously pouring organic material into the confinement bed. Admixing the porous matrix with the catalyst and the organic material to produce the mixture may include: forming a confinement bed comprising the organic material, and continuously pouring the porous matrix material into the confinement bed.

The method may further include: admixing a porous matrix material with the catalyst and the organic material using a helical mixing tool to produce the mixture; supplying the mixture via a first conveyor system into the zone of smoldering combustion; and removing the resultant porous matrix and catalyst via a second conveyor system. The organic material may be aggregated above or below ground level. The organic material may be a liquid, slurry, semi-solid, or solid. The catalyst may be selected from the group consisting of: calcium oxides and calcium carbonates, proton acids, multifunctional solids, and transition metals including synthesized or naturally occurring metals such as silver, aluminum, arsenic, gold, boron, barium, beryllium, bismuth, cadmium, cerium, cobalt, chromium, cesium, copper, iron, germanium, hafnium, mercury, indium, potassium, lanthanum, lithium, magnesium, manganese, molybdenum, sodium, niobium, nickel, phosphorus, lead, palladium, platinum, rubidium, rhenium, sulfur, antimony, scandium, selenium, tin, strontium, tantalum, tellurium, thorium, titanium, thallium, uranium, vanadium, tungsten, yttrium, zinc, and zirconium in all their forms and oxidative states, and combinations thereof.

In a third aspect, there is provided a method for producing and collecting at least one gas through smoldering combustion of an organic liquid, the method including: admixing a porous matrix material and the organic liquid to produce a mixture; heating a portion of the mixture; exposing the mixture to at least one oxidant, so as to initiate self-sustaining smoldering combustion of the mixture and the production of the at least one gas; and collecting the at least one gas.

In a fourth aspect, there is provided a method for producing and collecting hydrogen gas through smoldering combustion of an organic material, the method including: admixing a porous matrix material and the organic material to produce a mixture; heating a portion of the mixture; and exposing the mixture to at least one oxidant so as to initiate self-sustaining smoldering combustion of the mixture to cause the production of hydrogen gas; and collecting hydrogen gas.

The method may include exposing the mixture to at least one oxidant so as to initiate self-sustaining smoldering combustion of the mixture to cause the production of benzene, toluene, ethylbenzene, or xylene; and collecting benzene, toluene, ethylbenzene, or xylene. The smoldering combustion may be initiated by applying heat to the mixture from at least one radiative heating source coupled to the mixture.

In a fifth aspect, there is provided a method for producing and collecting a byproduct through smoldering combustion of an organic material, the method comprising: forming a porous mixture comprising an organic material and an inorganic material; heating at least a portion of the mixture; forcing an oxidant through the mixture so as to initiate a self-sustaining smoldering combustion of the organic material and to cause the production of a byproduct; and collecting the byproduct. The byproduct may be a solid. The porous mixture may include a porous matrix. The inorganic material may include a chemical element selected from the group consisting of phosphorus, a metal, and combinations thereof. The organic material and the inorganic material may be in a biosolid. Propagation of the combustion may be caused in a direction away from a point of initiation of the smoldering combustion. The components of the porous mixture may be aggregated in one of a reaction vessel, a pile, or a lagoon. At least one component of the porous mixture may be continuously fed into a zone of smoldering combustion. Forming the mixture may include batch feeding at least one component of the porous mixture into a vessel.

BRIEF DESCRIPTION OF THE DRAWINGS

The foregoing features of embodiments will be more readily understood by reference to the following detailed description, taken with reference to the accompanying drawings, in which:

FIG. 7A is a sectional schematic of a lagoon comprising an admixture of organic material and porous matrix with a plurality of air supply ports and heating elements.

FIG. 7B is a sectional schematic of a soil pile comprising an admixture of organic material and porous matrix with a plurality of air supply ports and heating elements.

FIG. 8A is a sectional schematic of a lagoon comprising an admixture of organic material and porous matrix, oxidant source, air supply port within the lagoon, and alternative heating elements.

FIG. 8B is a sectional schematic of a soil pile comprising an admixture of organic material and porous matrix, oxidant source, air supply ports within the pile, and alternative heating elements.

FIG. 10 is section view of a reaction vessel where a conveyor or auger device is used to convey a continuous or semi-continuous supply of an admixture of organic material and porous matrix material to a smoldering combustion reaction front.

FIG. 11 is a sectional schematic of a reaction vessel with a fixed or semi-permanent porous matrix where a continuous or semi-continuous supply of an organic liquid material is added to the porous matrix material.

FIG. 12 is an XRD analysis of a soil sample (FIGS. 12A and 12B) versus a known calcite refraction pattern (FIG. 12C).

FIG. 15 is a table presenting the results of the emissions analysis; in particular, the concentration of hydrogen in the collected vapor stream.

DEFINITIONS

Figure 1:
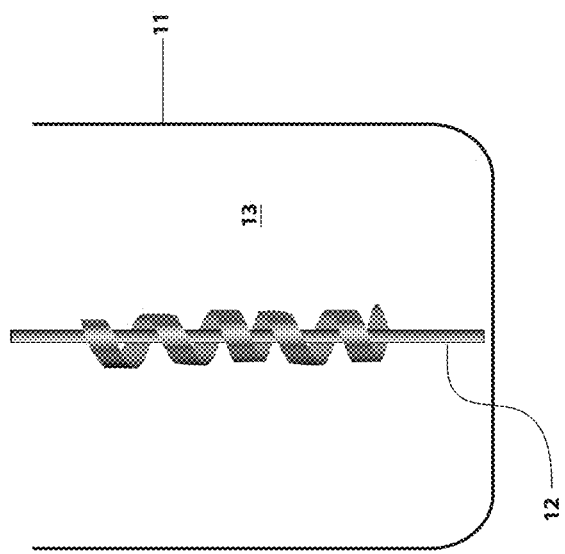
FIG. 1 is a schematic sectional view of a mixing vessel of embodiments of the invention and an exemplary mixing tool.

As used in this description and the accompanying claims, the following terms shall have the meanings indicated, unless the context otherwise requires.

The term "organic material" is defined as a material that is made up of molecules containing carbon and may or may not constitute a pure form of a given compound. A common example is provided by an organic solvent with or without other compounds dissolved therein.

The term "inorganic material" refers to compounds that are free or substantially free of carbon. In some instances, inorganic materials may be mixed with an organic material, for example compounds featuring phosphorus or other nutrients and metal impurities in a biosolid.

The term "ash" refers to the residue left after the combustion of a substance. Examples of ash relevant to the embodiments of the present invention include incombustible inorganic materials featuring phosphorus or other nutrients, precious metals such as gold, rare-earth elements and minor metals, platinum group elements, and metal oxides.

The term "porous matrix" refers to a synthetic or natural solid material having pores (open spaces) and wherein the solid material may be a single piece having pores or a collection of granular solids having pores there between. Examples of materials suitable of including the porous matrices of embodiments of the present invention include sand, gravel, glass beads, wood chips, zeolite, crushed stone, ceramic chips or beads, and combinations thereof. The fraction of pore space in a typical porous matrix is usually at least 15% to at most 75%, with at least 30% to at most 35% being a more typical range. A "porous mixture" is a "porous matrix" mixed with one or more other substances, such as organic liquids and catalysts.

The term "catalyst" refers to at least one, or a plurality of, substances that enables a chemical reaction to proceed differently than otherwise possible. Differences may include increasing the rate of a chemical reaction or causing the chemical reaction to occur. A catalyst does not undergo any permanent chemical change as a result of the reaction. Catalysts may be heterogeneous or homogenous. Catalysts may exist in the same phase or a different phase as the reacting chemicals. The term "catalysts" includes electrocatalysts, organocatalysts, enzymes and biocatalysts. Examples of catalysts include calcium oxides and calcium carbonates, proton acids, multifunctional solids, and transition metals including synthesized or naturally occurring metals such as silver, aluminum, arsenic, gold, boron, barium, beryllium, bismuth, cadmium, cerium, cobalt, chromium, cesium, copper, iron, germanium, hafnium, mercury, indium, potassium, lanthanum, lithium, magnesium, manganese, molybdenum, sodium, niobium, nickel, phosphorus, lead, palladium, platinum, rubidium, rhenium, sulfur, antimony, scandium, selenium, tin, strontium, tantalum, tellurium, thorium, titanium, thallium, uranium, vanadium, tungsten, yttrium, zinc, and zirconium in all their forms and oxidative states.

The term "smoldering combustion" refers to the act or process of burning without flame; a rapid oxidation accompanied by heat and light but not flame. In smoldering combustion, the combustion occurs on the surface of the fuel (i.e., not in the gas phase above the fuel as with a flame), where the fuel may be an organic material.

The term "self-sustaining" refers to reaction conditions wherein smoldering combustion propagates through the organic material without the application of external energy; that is, when the already smoldering organic material produces sufficient heat to elevate the temperature in the adjacent material to its combustion point. Conditions may be self-sustaining even if initially the application of heat is required to initiate smoldering combustion.

The term "matrix pile" refers to any pile, mound or conglomeration or aggregation of a porous matrix material. The matrix pile may be either permanent or semi-permanent.

The terms "ignition" and "initiation" refer to the process of initiating smoldering combustion.

The term "conductive heating" refers to the transfer of thermal energy by direct physical contact.

The term "convective heating" refers to the transfer of thermal energy by the movement of fluids.

The term "radiative heating" refers to the transfer of thermal energy by electromagnetic radiation.

The term "mixing tool" refers to an implement that when in use combines or blends an organic material, porous matrix, and catalyst into a mass or mixture.

An "impoundment" of organic material is an aggregation of organic material in a vessel, or in a pile on the ground, or in a below ground-level cavity.

The term "biosolid" refers to a semi-solid organic material from the treatment of sewage in waste water treatment plants.

DETAILED DESCRIPTION OF SPECIFIC EMBODIMENTS

In one aspect, the present application teaches the application of smoldering combustion to generate or recover valuable products, for example hydrogen or other gases or inorganic materials of value such as metals or other solid compounds. As self-sustaining smoldering combustion primarily uses the energy of the combusting organic materials to drive their destruction, as opposed to incineration which relies on heat generated from external fuel, generating such products via smoldering is far more economical. The self-sustaining smoldering combustion method is applicable to either solid or liquid organic wastes and can be conducted in synthetic or natural porous medium or granular solid matrices.

Smoldering refers to combustion of a material at the surface of the solid or liquid material itself. For example, when a combustible material (e.g., tobacco) is compacted to form a porous solid (e.g., a cigarette) and is ignited, the oxidant (e.g., oxygen) diffuses into the surface of the material and the combustion proceeds at the surface of the tobacco leaf fragment. Smoldering is referred to as a heterogeneous combustion reaction because the oxidant (e.g., a gas) and the fuel (liquid or solid) are distinct phases. This is in contrast to flaming combustion which is a homogeneous reaction occurring in a single gaseous phase.

When the oxidant is oxygen, either in its pure form or as a component of air, the smoldering combustion process results in the generation of energy, water, and vaporous emissions, primarily carbon dioxide, carbon monoxide and, to a lesser extent, volatile organic compounds and other compounds depending on the conditions of the smoldering system and the presence of suitable catalysts. Some of these emissions may have beneficial end uses. In addition, inorganic compounds within the combusting material will be separated from the other components of the combusting material as a result of the combustion process to form an ash which can be subsequently recovered. Some of the compounds within the recovered ash may have beneficial end uses.

In embodiments of the present invention, a porous matrix serves as a scaffold to entrap the organic material into a porous mixture, forming an environment that facilitates smoldering combustion. For a solid organic material, the porous matrix may be the organic material itself. For an organic liquid, the porous matrix is usually a separate, solid material. The liquid comes into contact with the pores of the porous matrix, thereby forming a porous mixture. Other configurations are also contemplated: in some embodiments, for example, the organic liquid may be mixed with an inorganic liquid, inducing the formation of a solid precipitate which then serves as porous matrix.

Smoldering combustion is maintained through the efficient recycling of energy within the system. First, the organic material is combusted, giving off heat energy which is retained by the porous matrix. Second, the retained heat energy is returned to the system from the porous matrix to pre-heat organic material farther removed from the point in space where the combustion process was initiated. Thus, following a short duration energy input to initiate the process, smoldering combustion can be self-sustaining (i.e., it uses the energy of the combusting organic materials, along with a supply of oxidant, to maintain the reaction) and is capable of propagating away from the point of ignition into the combustible matter. Smoldering is the only known type of combustion reaction that can propagate through the mixture of an organic material and a porous matrix mixture, that is, a system through which flames are usually not capable of propagating. In a self-sustaining process, the heating source may be terminated following the initiation of smoldering combustion.

Figure 16:
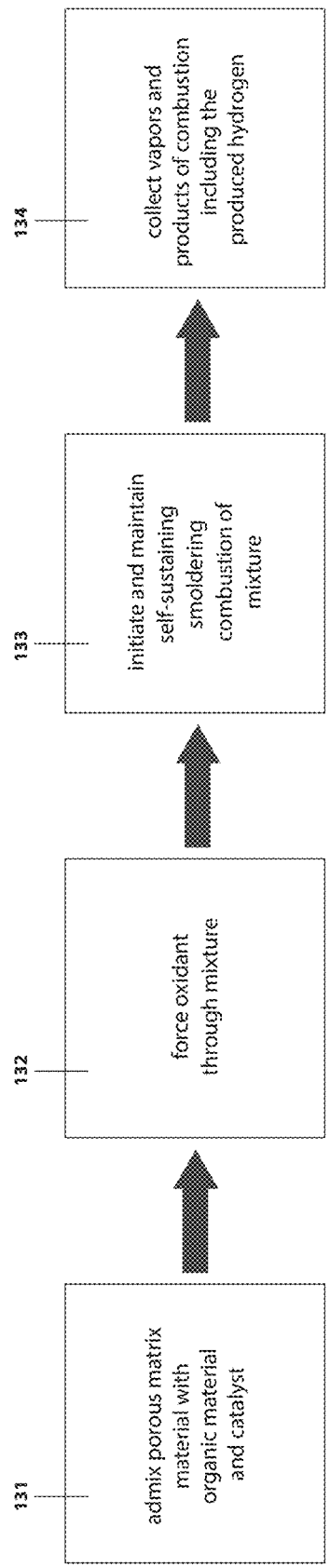
FIG. 16 is a flow diagram illustrating particular steps of a method for producing gases.

As illustrated in the exemplary flow diagram of FIG. 16, the self-sustaining smoldering combustion process can be extended to the production of valuable gaseous products, such as hydrogen, benzene, toluene, ethylbenzene, or xylene. To this end, appropriate catalysts may be present within either or both the porous matrix and organic material. The catalyst may also be present in proximity to the mixture. In some embodiments, the catalyst itself may be a product of the smoldering combustion. For example, a catalyst precursor may be present within the porous matrix, the organic material, or in proximity of the mixture, and is transformed into the catalyst by the heat from the smoldering combustion.

To promote the economically efficient production of gaseous products, it is usually preferable that the following conditions be met: (1) the organic material contains sufficient inherent energy to sustain a smoldering combustion process (i.e., it is a combustible material); (2) the organic material is a porous matrix itself or is mixed with a porous matrix to form a porous mixture that enables the smoldering process; (3) a heat source is provided to initiate the process; and (4) at least one oxidant (e.g., oxygen, air) initiates and maintains the process.

The self-sustaining smoldering combustion process has numerous advantages for the production of hydrogen. For one, in many instances the products of the smoldering combustion process include volatile organic compounds emitted as vapors, carbon dioxide, carbon monoxide, energy and water, so only a catalyst needs be added to generate hydrogen. Second, the process is self-sustaining (i.e., it uses the energy of the combusting organic materials, along with a supply of oxidant, to maintain the reaction). Therefore, the smoldering combustion process avoids the need for the continuous addition of energy, heat, or fuels to maintain the high temperatures required for producing hydrogen as in a steam reforming process.

Figure 17:
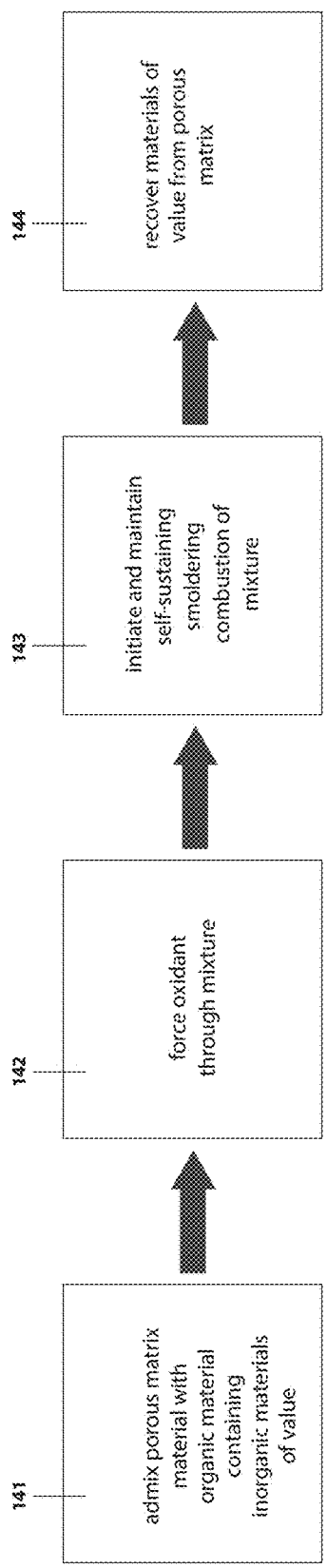
FIG. 17 is a flow diagram illustrating particular steps of a method of recovering materials of value from a porous matrix.

As illustrated in the example flow diagram of FIG. 17, the self-sustaining smoldering combustion process may also be extended to the recovery of materials of value in the form of solid byproducts of the smoldering combustion process. A typical example is provided by inorganic materials that are admixed with the organic material, for instance valuable metals that are present as impurities in an organic material such as tar or a biosolid. To promote the economically efficient recovery of valuable solid byproducts, it is usually preferable that the following conditions be met: (1) the organic material contains one or more materials amenable to be recuperated as solid byproducts of value after the smoldering combustion; (2) the organic material contains sufficient inherent energy to sustain a smoldering combustion process despite the presence of inorganic materials within the organic material; (3) the organic material is a porous matrix itself or is mixed with a porous matrix to form a porous mixture that enable the smoldering process; (4) a heat source is provided to initiate the process; and (5) at least one oxidant (e.g., oxygen, air) initiates and maintains the process. Thanks to its self-sustaining nature, the smoldering combustion process avoids the need for the continuous addition of energy, heat, or fuels as in an incineration process. Usually, the presence of a catalyst is not needed to promote the recovery of inorganic materials, although one or more catalysts may still be included to promote the formation of desired gaseous products.

FIG. 1 illustrates a mixing vessel 11, according to certain embodiments of the invention, into which an organic material, a porous matrix, and/or a catalyst are added. A mixing tool 12 is used to create an admixture of organic material, catalyst, and porous matrix material 13. In particular embodiments of the invention, mixing may occur within the reaction vessel or impoundment in which smoldering combustion is to be initiated. In the particular embodiment of FIG. 1, a helical mixing tool 12 is depicted, although any shape may be used, including corkscrew and paddle-shaped mixing tools.

A mixing vessel 11 may be a manufactured cylindrical column or rectangular box (e.g. stainless steel vessel) or bin, an excavated hole, designated pile, or walled-in enclosure in which a porous medium, and/or catalyst is emplaced and mixed with an organic material in preparation for application of the smoldering process.

The porous matrix may be a loose or fixed porous material 13. A fixed porous matrix may be a manufactured (e.g. steel mesh, porous plate) or natural (e.g. lava rock, coral) material. A loose porous matrix may be manufactured (steel shot, glass beads) or natural (e.g. gravel, sand) materials. The porous matrix may contain the catalyst or the catalyst is added to and mixed with the organic material and porous media to create a mixture. The porous matrix may be the organic material itself.

Mixture emplacement may be achieved manually, via backhoe or excavator, automatically via screw conveyor or conveyor belt systems. Liquid emplacement may be achieved via pouring, pumping, conveyor, or gravity feed (e.g., siphoning).

Many types of organic materials may be used as the fuel source for the production of hydrogen through smoldering combustion by the methods disclosed herein. Examples of organic materials for which the methods of the present application are particularly effective include hydrocarbon mixtures such as coal, coal tar and creosote, shredded tires, agricultural waste, petroleum hydrocarbons, and waste sludges. Methods described here are particularly well suited to organic liquids and to organic slurries.

Similarly, many types of organic materials may be used as the fuel source for the recovery of inorganic materials of value through smoldering combustion by the methods disclosed herein. Examples of organic materials for which the methods are particularly effective include biosolids. The methods described herein are also particularly well suited to the recovery of inorganic materials from organic liquids and organic slurries.

Figure 2:
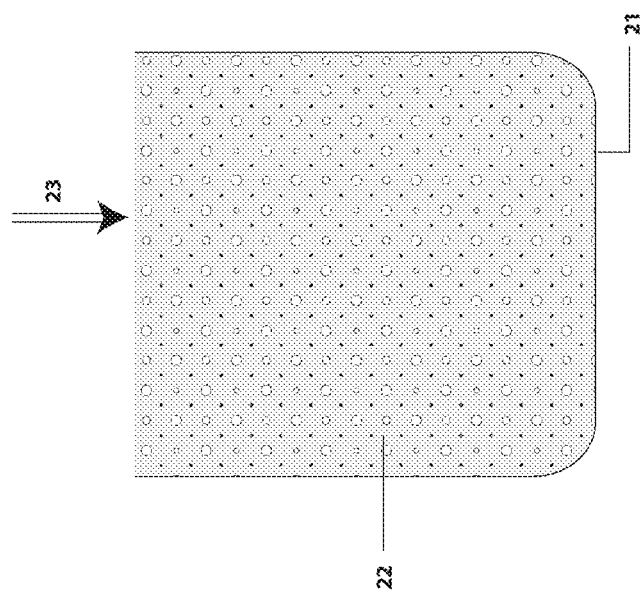
FIG. 2 is a schematic sectional view of a mixing or reaction vessel containing a fixed or loose porous matrix.

FIG. 2 depicts another embodiment of the invention in which a mixing or reaction vessel 21 contains a fixed or loose porous matrix 22 into which an organic material and/or catalyst is added 23 to create an admixture of organic material, catalyst, and porous matrix material. In particular embodiments where a liquid or semi-liquid organic material is combusted, an admixture is created as the organic material percolates between the matrix particles. In embodiments where the porous matrix is loose, mixing may be assisted by using a mixing tool as described herein. It is also possible to add solid organic waste to a loose porous matrix in a mixing or reaction vessel and subsequently create an admixture by using a mixing tool.

The mixing tool may be a mechanical mixer 12 such as an auger or a screw or other rotating devices. Mixing may also be achieved via vibration, or rotation (flipping) of the entire vessel. The mixing may also be achieved passively by adding a liquid organic material to the porous matrix within the vessel and allowing it to disperse naturally due to gravity or capillarity or by injecting under pressure into the bottom of the vessel, filling the pore space of the matrix as it migrates to the top of the vessel. The organic material may be added to the porous matrix as a flow or stream of fluids through a pipe, chute, or other emitter.

The mixing process may take place within the same vessel used for the smoldering process in a continuous, batch or semi-batch process, or completed in a separate dedicated mixing vessel.

Addition of the matrix material 23 may be achieved manually, via backhoe or excavator, or automatically via screw conveyor or conveyor belt systems. The conveyor system may be a screw or belt conveyor system leading from a mixing vessel to the reaction vessel and from the reaction vessel to a matrix soil pile. The admixture conveyor may be a screw conveyor or other mechanical conveying device or be a release mechanism to allow the gravity-fed passage of treated material through the reaction vessel. The conveyor system may be a screw or belt conveyor system leading from a mixing vessel to the reaction vessel and from the reaction vessel to a matrix pile or mixing vessel. The admixture conveyor may be a screw conveyor or other mechanical conveying device or be a release mechanism to allow the gravity-fed passage of treated material through the reaction vessel.

Figure 3:
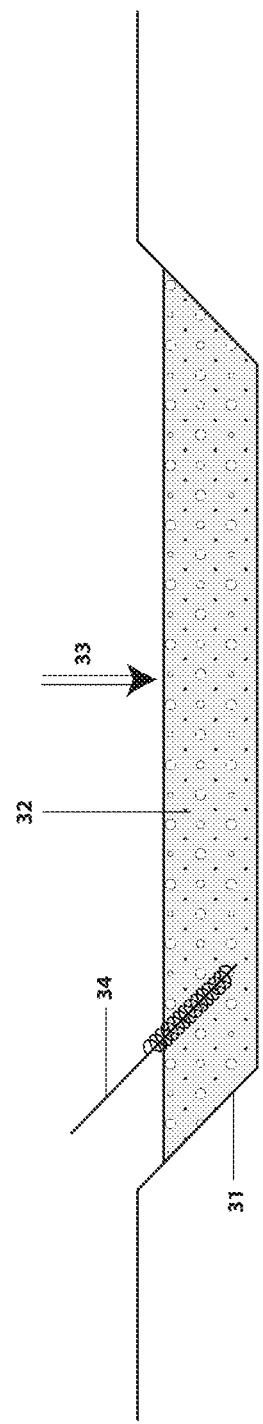
FIG. 3 is a schematic sectional view of a lagoon containing a volume of solid, semi-solid, or liquid organic waste into which a matrix material is added.

In some embodiments, the invention includes aggregation of organic material with a porous matrix to form a porous mixture. In some of the embodiments described herein, aggregation occurs when the organic material impoundment is in an above-ground vessel. However, it is also possible to practice embodiments of the invention when the organic material is in an impoundment below ground (i.e., below the surface of the earth) in a cavity such as a lagoon or pool. FIG. 3 illustrates an embodiment wherein the impoundment is an organic material lagoon 31. The lagoon includes a volume of solid, semi-solid, or liquid organic material 32 and into which a porous matrix material and/or catalyst 33 is added and admixed with a mixing tool 34 to create an admixture of organic material, catalyst, and porous matrix material. An example of an organic material lagoon 31 may be a lined or unlined excavation, converted pool, or natural depression used to accumulate and store an organic waste 32. It should be appreciated that the order of addition is not particularly important. Embodiments are also contemplated where the lagoon is first filled with porous matrix material and the organic material and catalyst is added thereafter. In further embodiments, the lagoon is first filled with catalyst and the porous matrix and organic material are added thereafter. Either way, an admixture is formed in below-ground space of suitable proportions to permit smoldering combustion, production of commercially valuable gases or recovery of inorganic materials of value.

Figure 4:
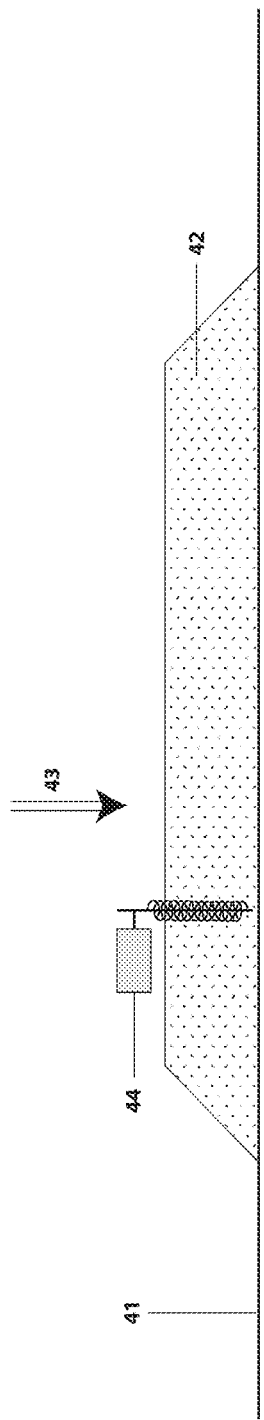
FIG. 4 is a schematic sectional view of matrix pile or soil pile to which an organic material is applied and admixed.

Further embodiments are contemplated where the organic waste impoundment is above-ground in a matrix pile or mound. FIG. 4 illustrates such an embodiment where a matrix pile 42 rests on the surface of the earth or fabricated structure 41 into which an organic material and/or catalyst 43 is applied. A mixing tool 44 may be utilized to circulate the organic material and/or catalyst and create the admixture. The matrix pile may either be freestanding or may be supported within or by additional structures. For example, walls may be used to encase the pile.

An example of a matrix pile 42 may be a pile of material excavated for the construction of a depression, a pile of contaminated material excavated as part of a site remediation strategy, or a stockpile of granular material. The organic material may be applied or admixed with the matrix pile by pouring the organic material onto the surface of the matrix pile through a pressurized or gravity-fed pipe, chute, or emitter, and allowing it to percolate into the matrix pile under gravity or forced pressure, tilled into the matrix pile via tillers or hoes, mixed via backhoe, excavator or soil mixing/drilling rigs.

Figure 5:
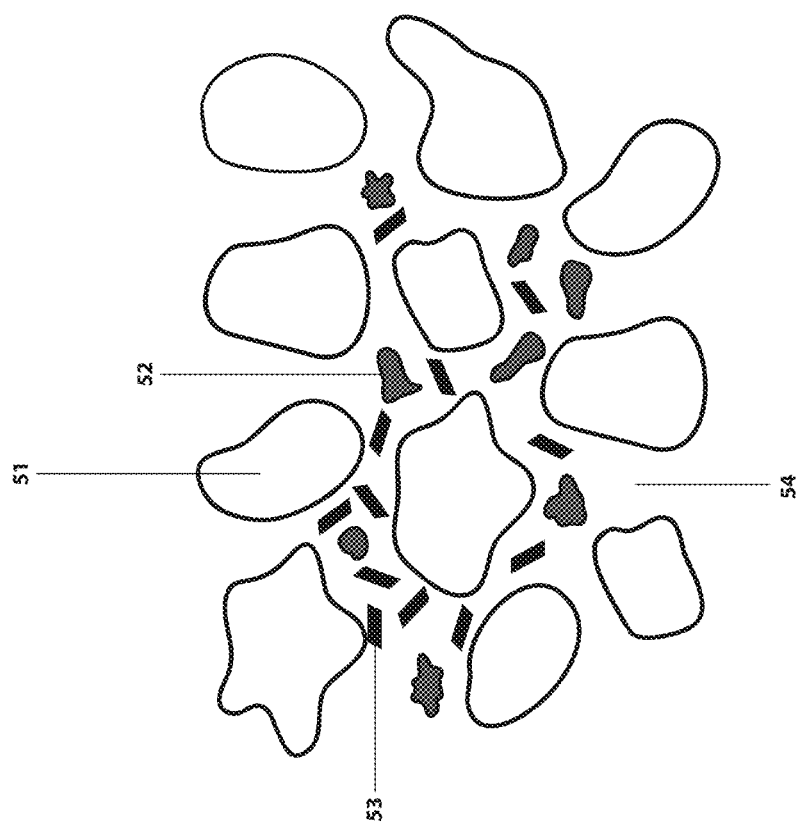
FIG. 5 is an enlarged schematic view of an organic material/porous matrix mixture according to embodiments of the invention.

FIG. 5 illustrates an organic material/porous matrix mixture including solid particles 51, continuous or discontinuous chunks, pieces, blobs or ganglia of organic material 52 and catalyst 53 located within the pore spaces 54 of the porous matrix. Embedding the combustible material in a porous matrix allows the energy released by the exothermic combustion reaction to remain in the system such that the reaction becomes self-sustaining. As noted above, for the recovery of inorganic materials of value, the presence of a catalyst 53 is usually not required to combust the organic material in a smoldering combustion reaction.

Some embodiments are possible where the catalyst 53 is contained on or within the solid particle 51 and may be absent from the pore spaces 54 of the porous matrix. Further embodiments are possible where the organic material 52 is also the solid particle 51 and may be absent from the pore spaces 54 of the porous matrix.

Although the principle of heat recirculation is readily understood, its practical application requires balancing many variables to ensure efficiency, controlled combustion intensity (i.e., to maintain smoldering), and controlled product formation rates. Particular attributes of the porous matrix that may require optimization include porous matrix particle size, pore size, permeability, and mineralogy. Particular attributes of the organic material that may require optimization include chemical composition, viscosity, density, volatility, and wettability. Particular attributes of the catalyst that may require optimization include catalyst type, surface area, and concentration within the mixture. Particular attributes of the combustion system that may require optimization include pre-heating intensity, pre-heating duration, oxidant flow rate at the time of ignition, oxidant flow rate after ignition, air pressure, and oxidant content.

In some embodiments of the invention, the following porous matrix materials have been found to form suitable admixtures with organic materials: sand, gravel, ceramic beads, porous metals, porous ceramics, coal, charcoal, and glass beads. These materials, if sized correctly, have a high surface area to volume ratio such that a sufficient amount of heat generated during the combustion process is transferred to and stored in the matrix material, so as to make the heat stored in the matrix material available to assist in further combustion of the organic material. The matrix material should be further characterized by sufficient pore space to receive organic material admixed therewith, and by surface, shape, and sorting characteristics that are amenable to air flow through the pore spaces.

Figure 6:
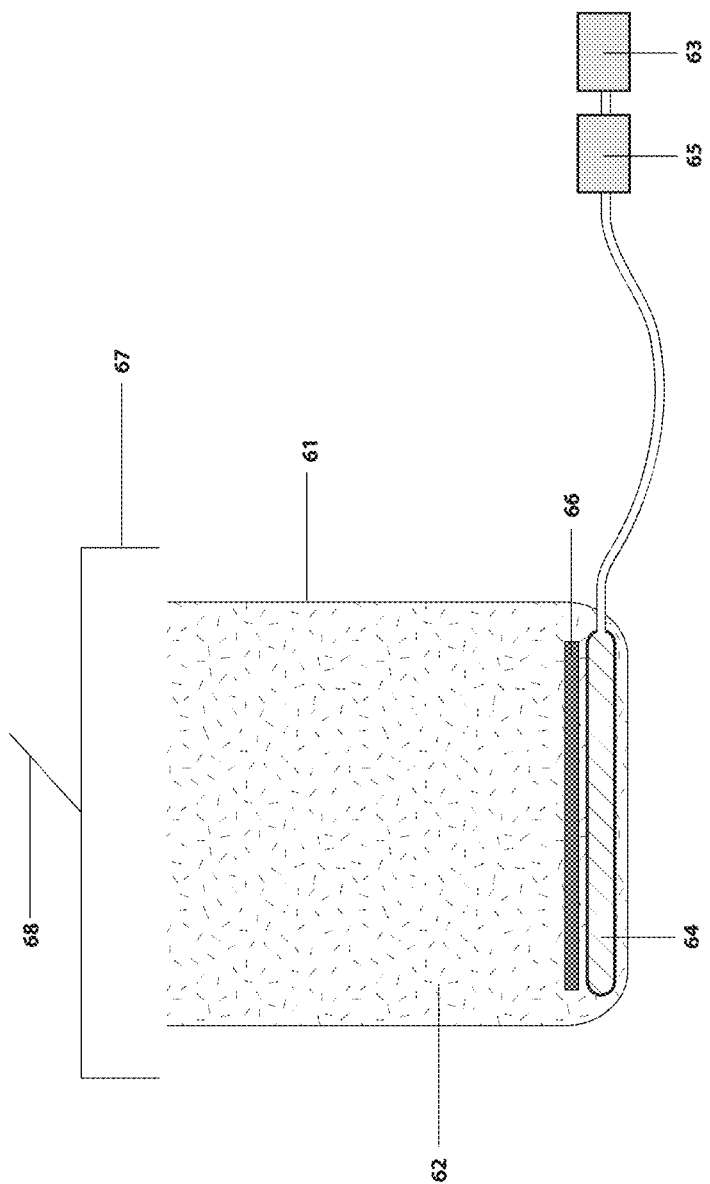
FIG. 6 is a schematic section of a combustion reaction vessel comprising an oxidant source, an air supply port and heating elements.

Ignition of smoldering combustion requires both a heating source to initiate combustion and a source of oxidant to initiate and maintain combustion. FIG. 6 illustrates a combustion reaction vessel 61 containing an admixture of organic material, porous matrix and, in some embodiments, a catalyst 62. Oxidant is supplied to the reaction vessel from an oxidant source 63 through an oxidant supply port 64. The oxidant supply port may comprise a single aperture into the reaction vessel or may comprise a manifold with multiple apertures placed within the reaction vessel. Two different heating sources are depicted, which may be used either alone or in combination. For example, a heating source 65 may be placed in-line with the supplied oxidant to supply convective heat to the admixture. Convective heating sources may also be positioned within the reaction vessel or within the interior of the reaction vessel. Additionally, an internal heating source 66 may be placed within the reaction vessel to supply conductive or radiative heat for ignition and maintenance of smoldering. As shown in FIG. 6, the internal conductive/radiative heating source may be placed towards the bottom of the reaction vessel to propagate a "bottom-to-top" combustion front. Additional conductive heat sources may be place throughout the interior and/or along the walls of the reaction vessel to initiate combustion at varying levels within the admixture. Vapors and products of the combustion reaction including desired gaseous products such as hydrogen can be collected at the outlet of the reaction vessel 61 with a vapor collection system 67 and routed 68 for use or subsequent processing. Ash containing inorganic materials of value will remain admixed with the porous matrix following combustion of the organic material. The ash can be separated from the porous matrix through a number of means including sieving of the porous matrix, use of a magnetic field, agitation of the mixture, or other means and subsequently processed to recover the inorganic materials of value.

The oxidant source may be an air compressor, blower, or passive source connected to the reaction vessel through piping or tubing with regulated or unregulated pressure or flow. The oxidant supply port may be a series or singular section of perforated pipe, a port, or an open cavity (plenum) to distribute oxidant in the desired pattern across the base of the admixture. The heating element may be an electrically-powered cable heater, electrically-powered cartridge heater, electro-magnetically activated heating system, or radiative tube heater in which propane or other external fuel source is internally supplied and combusted.

The oxidant supply ports may be perforated plates, screens, perforated carbon-steel, stainless-steel or other material rods, carbon-steel, stainless-steel or other material wells with wire-wrapped or slotted screens installed within the vessel. The heating elements may be electrical resistive heaters or radiative heaters installed or placed within or adjacent to the air supply ports, installed in or adjacent to the mixture surrounding the supply ports, or an element heating air passing through the supply ports and into the mixture.

In particular embodiments, the oxidant is oxygen supplied as a component of atmospheric air. The reaction is controllable such that terminating the supply of oxygen to the reaction front terminates the reaction. Increasing or decreasing the rate of oxygen flux to the reaction front will also increase or decrease the rate of combustion and, therefore, the propagation rate of the reaction front, respectively.

It should be appreciated that combustion can be monitored according to methods known to those of skill in art to determine the amounts of oxygen, air or other oxidant required to maintain smoldering combustion. Combustion temperatures are commonly monitored with thermocouples which can be placed throughout the volume of material being combusted.

Combustion gases and hydrogen and other compounds produced by the process are collected at the outlet of the reaction vessel or at the surface of the admixture of organic and porous matrix material. Ash containing inorganic materials of value can be collected by processing the porous matrix following combustion to physically separate the porous matrix material from the ash.

As illustrated in FIG. 7, embodiments of the present invention may utilize impoundments with multiple oxidant supply ports and heating elements. FIG. 7A depicts an embodiment wherein the impoundment is a lagoon containing an admixture of organic material, a porous matrix 711, and, in some embodiments, a catalyst. Oxidant may be supplied to the lagoon or matrix pile from an oxidant source 712 that is coupled to oxidant supply ports 713. The oxidant supply ports may be boreholes drilled into a sufficiently solid mixture. Alternatively, the oxidant supply port may be perforated hollow shafts inserted into either solid or relatively liquid mixtures. The oxidant supply ports may be spaced according to the overall dimensions of the lagoon so that oxidant is delivered in sufficient quantity and at a sufficient rate throughout the lagoon, thereby facilitating smoldering combustion throughout the lagoon. Similarly, a single or plurality of convective heating element(s) 714 may be placed in-line with the supplied oxidant to initiate smoldering combustion at multiple points within the lagoon. Additionally or alternatively, multiple conductive, convective or radiative heating elements 715 may be positioned within the boreholes or shafts or within backfilled materials so that they are internal to the waste lagoon. Vapors and products of the combustion reaction including commercially valuable gases such as hydrogen can be collected at the surface of the lagoon containing an admixture of organic material, catalyst, and porous matrix 711 with a vapor collection system 716 and routed 717 for use or subsequent processing. Ash containing inorganic materials of value can be collected by processing the porous matrix 711 following combustion to physically separate the porous matrix material from the ash.

FIG. 7B illustrates an embodiment wherein the impoundment is a matrix pile 721. As above, both multiple air supply ports and heating elements may be used. For example, oxidant may be supplied to the organic matrix pile from an oxidant source 722 that is coupled to air supply ports 723. The air supply ports may be boreholes drilled into a sufficiently solid mixture or perforated hollow shafts inserted into either solid or relatively liquid mixtures. The air supply ports may be spaced according to the overall dimensions of the pile so that oxidant is delivered in sufficient quantity and at a sufficient rate throughout; thereby facilitating smoldering combustion throughout the pile. Similarly, a single or plurality of convective heating element(s) 724 may be placed in-line with the supplied air to initiate smoldering combustion at multiple points within the matrix pile. Additionally or alternatively, multiple conductive, convective or radiative heating elements 725 may be positioned within the boreholes or shafts or within backfilled materials so that they are internal to the matrix pile. Vapors and products of the combustion reaction including the produced hydrogen can be collected at the surface of the matrix pile containing an admixture of organic material, catalyst, and porous matrix 721 with a vapor collection system 726 and routed 727 for use or subsequent processing. Ash containing inorganic materials of value can be collected by processing the porous matrix 721 following combustion to physically separate the porous matrix material from the ash.

FIG. 8 illustrates additional embodiments of impoundments with oxidant supply ports and heating elements. In FIG. 8A, a lagoon is shown containing an admixture of organic material, a porous matrix 811, and in some embodiments, a catalyst. Oxidant is supplied to the lagoon from an oxidant source 812 through an oxidant supply port(s) 813 within or beneath the lagoon. The oxidant supply ports may comprise multiple entry points into the lagoon or, as depicted, a manifold-type installation placed towards the bottom of the lagoon. Heating element(s) 814 may be placed in-line with the supplied oxidant or within or beneath the lagoon. As above, the particular position of the heating element(s) and oxidant supply ports may be optimized to facilitate smoldering combustion as needed for a given mixture. Vapors and products of the combustion reaction including gases such as hydrogen can be collected at the surface of the lagoon containing an admixture of organic material, catalyst, and porous matrix 811 with a vapor collection system 816 and routed 817 for use or subsequent processing. Ash containing inorganic materials of value can be collected by processing the porous matrix 811 following combustion to physically separate the porous matrix material from the ash.

FIG. 8B illustrates a corresponding embodiment wherein the impoundment is a matrix pile. In FIG. 8B, a matrix pile is shown containing an admixture of organic material, a porous matrix 821, and, in some embodiments, a catalyst. Oxidant is supplied to the pile from an oxidant source 822 through an oxidant supply port 823 within or beneath the pile. As described for lagoon embodiments, several configurations of oxidant supply ports are possible, including multiple inlets and single manifold-type structures. Heating element(s) 824 may be placed in-line with the supplied oxidant to provide convective heat. Additionally or alternatively, a conductive, convective or radiative heating source 825 may be placed within or beneath the pile. Smaller, individual conductive, convective or radiative heating sources may also be placed at multiple locations within the pile. Vapors and gaseous products such as hydrogen can be collected at the surface of the matrix pile containing an admixture of organic material, catalyst, and porous matrix 821 with a vapor collection system 826 and routed 827 for use or subsequent processing. Ash containing inorganic materials of value can be collected by processing the porous matrix 811 following combustion to physically separate the porous matrix material from the ash.

The oxidant supply ports may be perforated direct-push carbon-steel, stainless-steel or other material rods, carbon-steel, stainless-steel or other material wells with wire-wrapped or slotted screens installed horizontally through the matrix pile or lagoon. Oxidant supply ports may also be perforations in the engineered structure supporting the mixture. The heating elements may be electrical resistive heaters or radiative heaters installed or placed within or adjacent to the oxidant supply ports, installed in the matrix pile surrounding the oxidant supply ports, or an above-ground element heating a gaseous oxidant passing through the oxidant supply ports and into the matrix pile.

Embodiments of the present invention may be designed such that a combustion front propagates through a reaction vessel, lagoon or matrix pile. The combustion front may be directed through heating and air flow spatial manipulations to proceed upwards or laterally in any direction.

Figure 9:
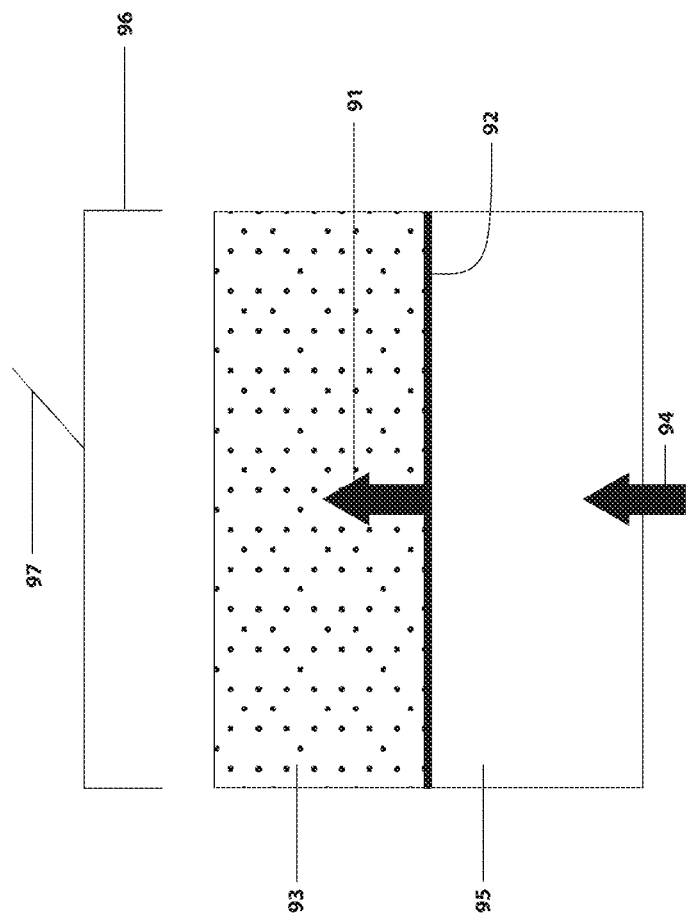
FIG. 9 is an illustration of a combustion front progressing through the admixture of organic material and porous matrix material along the direction of air flow.

FIG. 9 illustrates the progress 91 of the combustion front 92 through an admixture of organic material, a porous matrix material 93, and in some embodiments, a catalyst. In these embodiments, propagation of the combustion front proceeds along the direction of air flow 94. As the combustion front proceeds through the porous matrix, organic material within the combustion front is combusted and organic material in advance of the combustion front is heated. Combustion of the organic material proceeds essentially to completion, and, in some embodiments, leaves behind an area of porous matrix and catalyst 95 and in other embodiments leaves behind an area of porous matrix and ash 95 where the organic material has undergone a volumetric reduction as a result of smoldering combustion. Vapors and products of the combustion reaction including hydrogen are driven to the collection system 96 at the outlet of the vessel or surface of the lagoon or pile and routed 97 for use or subsequent processing. Ash containing inorganic materials of value can be collected by processing the porous matrix 95 following combustion to physically separate the porous matrix material from the ash.

In additional embodiments, the combustible mixture is conveyed relative to the combustion front. FIG. 10 illustrates a reaction vessel 101 according to such an embodiment where a first conveyor or auger device 102 is used to convey a continuous or semi-continuous supply of an admixture of organic material, porous matrix material, and, in some embodiments, catalyst 103 to a pseudo-stationary smoldering combustion reaction front 104. The admixture supply is maintained through use of the conveyor system 102 transporting a pre-mixed admixture of organic material, porous matrix material, and, in some embodiments, catalyst 103 to the reaction vessel. The smoldering combustion reaction front is maintained through the addition of oxidant 105. A mixing or conveyor tool 106 may be utilized to propagate the mixture through the reaction vessel. Although a helical mixing tool is depicted, alternatively shaped tools (e.g., corkscrews, paddles) or gravity may be used. The mixing tool may also serve to circulate oxidant through the admixture. At the combustion front, the organic material in the mixture is essentially consumed as a result of smoldering combustion 106. The resultant solid residue, which may contain catalyst and porous matrix or ash and porous matrix 107 is withdrawn from the reaction vessel in a continuous or semi-continuous manner and transported along a second conveyor system 108 as a catalyst/porous matrix or ash/porous matrix mixture 109. Vapors and products of the combustion reaction including the produced hydrogen are driven to the collection system 110 at the outlet of the vessel or surface of the lagoon or pile and routed 111 for use or subsequent processing. Ash containing inorganic materials of value can be collected by processing the solid residue following combustion to physically separate the porous matrix 107 material from the ash.

In certain embodiments, a fixed or semi-permanent porous matrix may be used. Rather than mixing the organic material, porous matrix, and, in some embodiments, catalyst per se, these embodiments allow the organic material to percolate through a bed of fixed or semi-permanent matrix. In particular embodiments with a semi-permanent matrix, however, percolation may be assisted with a mixing tool.

FIG. 11 illustrates a particular embodiment with a fixed or semi-permanent porous matrix, which, in certain embodiments, contains a catalyst. A reaction vessel 111 is shown with a bed of fixed or semi-permanent porous matrix, which, in certain embodiments, contains a catalyst 112 to which a continuous or semi-continuous supply of an organic material is added (not shown). After the admixture is formed, smoldering may be initiated at the smoldering combustion reaction front 113. Smoldering may be initiated by convective, conductive or radiative heating elements placed outside, on, or in the reaction vessel proximal to where smoldering is to be initiated. Smoldering may be maintained through the addition of oxidant 114 via an oxidant supply port 115. The combustion front proceeds along the direction of oxidant flow through the mixture of permanent or semi-permanent porous matrix and organic material. The position of the combustion reaction front 113 is governed by the rate of oxidant addition 115, the rate of organic material addition and the properties of the admixture of organic material, porous matrix material, and operational parameters (e.g., oxidant flow rate). As the combustion front proceeds, organic material is combusted. Below the combustion front is the resultant porous matrix, which, in certain embodiments, contains a catalyst and in other embodiments contains ash containing inorganic materials of value 116. Vapors and products of the combustion reaction including hydrogen are driven to the collection system 117 at the outlet of the vessel or surface of the lagoon or pile and routed 118 for use or subsequent processing. Ash containing inorganic materials of value can be collected by processing the porous matrix 116 following combustion to physically separate the porous matrix material from the ash.

The embodiments of the invention described above are intended to be merely exemplary; numerous variations and modifications will be apparent to those skilled in the art. All such variations and modifications are intended to be within the scope of the present invention as defined in any appended claims.

Example 1

Smoldering combustion tests were conducted to demonstrate the generation of hydrogen through the smoldering of coal tar mixed with soil. An analysis of the metals contained in the bulk soil returned a calcium content within the soil of 24.9 wt % which is a strong indication of the presence of calcite and/or calcium oxide. In addition, X-ray diffraction (XRD) analysis was conducted, confirming that the material analysed was predominantly composed of calcite, as illustrated in FIGS. 12A, 12B, and 12C.

Calcite is the main crystal structure of calcium carbonate and is the predominant component of most limestone rock. When calcite is exposed to temperatures in excess of 800° C., a reversible chemical change occurs where a carbon dioxide ($CO_2$) group is released, resulting in the formation of calcium oxide (CaO), commonly referred to as lime:

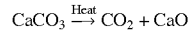

Without being bound to any particular theory, production of hydrogen gas ($H_2$) from carbonaceous organic materials is believed to proceed in two steps in the presence of a catalyst. As calcium oxide is believed to be the catalyst, they are (i) steam reforming:

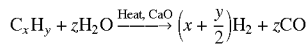

followed by (ii) a water-gas shift:

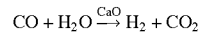

In this instance, therefore, the catalyst is formed as a product of the smoldering combustion. The catalytic properties of calcium oxide produced from the oxidation of calcite from natural derivatives such as limestone were the subject of previous investigations. In those studies, calcium oxide was shown to function as a catalytic surface for the production of hydrogen from tar model compounds. However, the studies were conducted in carefully controlled and optimized reactors which were contained within an oven to keep the entire system at an optimal process temperature. This contrasts with the examples of the present application, where heat was not provided by an outside source, but instead produced by the smoldering reaction itself. Moreover, all catalyst materials in the previous studies had already been calcinated to CaO prior to the start of the test, rather than being formed in situ as in the examples of the present application. Tars and steam were also run through the system at a controlled flow rate. As such, the previous studies were not designed to evaluate the applicability of smoldering combustion to meet the operational, thermal, and chemical requirements of running the calcite calcination, steam reforming, and water-gas shift reactions all at the same time. Also, and just as importantly, the previous studies did not provide any guidance as to whether the smoldering combustion could be self-sustaining and yield valuable gaseous products such as hydrogen.

The smoldering combustion tests reported in this application showed that, in the right conditions, smoldering combustion can reach temperatures in excess of 1000 degrees Celsius. These high temperatures are capable of converting calcite within soil to calcium oxide in situ, thus forming the catalyst required for hydrogen production during the smoldering process.

Figure 13:
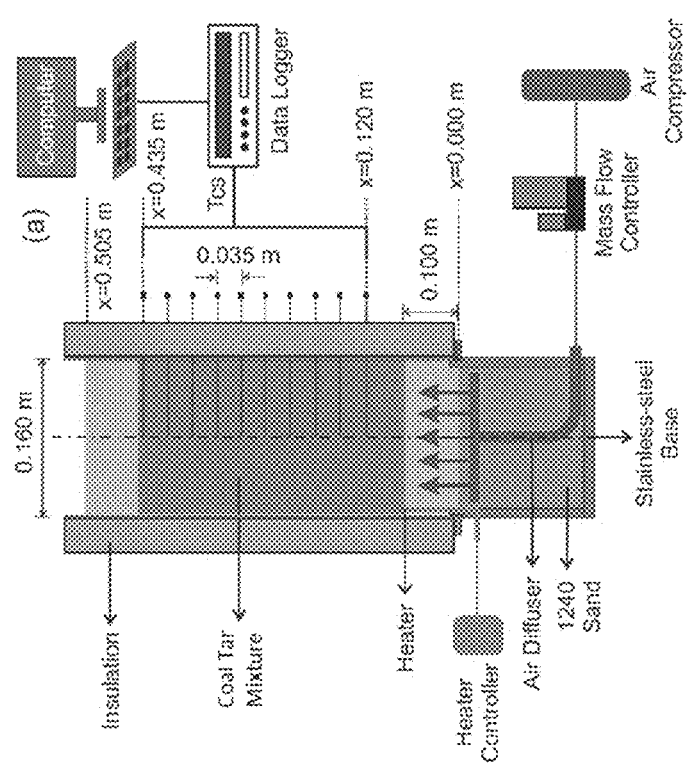
FIG. 13 is a schematic of the general smoldering experimental setup.

Smoldering hydrogen production tests were carried out in a 60 centimeter by 16-centimeter diameter stainless steel column with centerline thermocouple probes (K-type, Omega Ltd.) placed every 3.5 centimeters. The column was insulated with 5-centimeter thick mineral wool and the assembly sat upon a base which contained a 450 W, 120V coiled resistive heater (Watlow Ltd.) controlled by a 120V AC, single-phase variable power supply (STACO Energy Products) and air sparger. Air was injected into the system to initiate and control the smoldering reaction through the air sparger which was controlled by a mass flow controller (FMA5400/5500 Series, Omega Ltd.). The base was filled with clean, coarse sand (#12, Bell & Mackenzie Co.) until both the heater and air diffuser were covered. A coal tar/soil mixture was then placed in the column starting 1 centimeter above the resistive heater and packed to a height of 15 centimeters. This was then covered with a 10 centimeter cap of clean, coarse sand. Emissions samples were taken from the gas stream in a silonite canister and analyzed for the presence of hydrogen ($H_2$), volatile organic compounds (VOCs), $O_2$, $CO_2$, CO, and C1-C4 hydrocarbons by TestAmerica Laboratories Ltd. FIG. 13 illustrates the experimental setup.

The test was carried out by pre-heating the soil/coal tar mixture until the first thermocouple measured a temperature of 400 degrees Celsius. Then, air flow was initiated allowing the smoldering combustion reaction to initiate and propagate. An airflow rate of 40 liters per minute was used in this test. Once the smoldering reaction had started, the heater was turned off and the reaction was self-sustaining. Airflow was continued until the reaction extinguished naturally because it had reached the clean sand cap and all organic material was eliminated.

Figure 14:
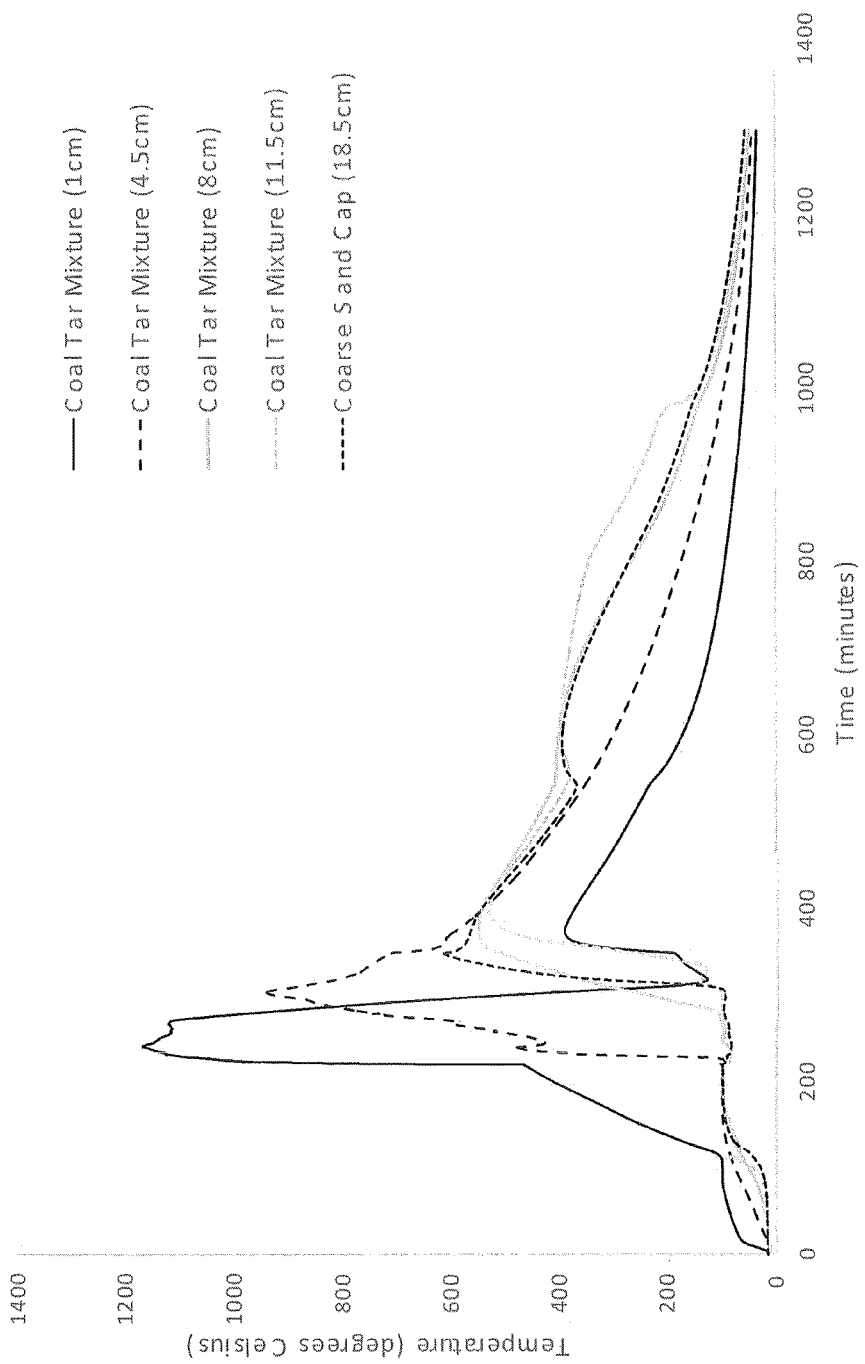
FIG. 14 is a temperature profile illustrating the progression of the smoldering combustion through the experimental apparatus.

FIG. 14 shows the temperature profile through the column over time. The smoldering reaction achieved a peak temperature of 1128 degrees Celsius which is capable of converting the calcite to calcium oxide as well as provide the heat energy necessary for steam reforming.

Analytical results received for the emissions sample indicated that hydrogen was produced at a volume fraction of 3.8 v/v % over the duration of the smoldering period. Select emissions analyses from the experiment can be seen in FIG. 15.

Example 2

Smoldering combustion tests demonstrating the recovery of ash containing inorganic materials of value from waste water treatment plant biosolids are carried out according to established experimental procedures presented in Pironi et al., 2011; Switzer et al., 2009; Yermán et al., 2015. A 60-centimeter tall and 15-centimeter diameter stainless steel column is rested upon a base component that houses a coiled resistive heater (450 W, 120 V, Watlow Ltd.) and an air injection manifold. Sixteen thermocouples (Type K, Omega Ltd.) are inserted horizontally into the center of the column at 3.5 centimeter intervals along the column height to track temperatures. The heater is connected to a 120 V AC, single-phase variable power supply (STACO Energy Products) and the entire column is wrapped in insulation (5-centimeter thick mineral wool, McMaster Carr) as is typical in smoldering studies to reduce external heat loss associated with the scale of the experimental system (Switzer et al., 2009). The apparatus rests on a mass balance (KCC150, Mettler Toledo) to provide real-time mass loss measurements. The emissions are analysed for volume fractions of carbon monoxide, carbon dioxide, and oxygen using a gas analyser (MGA3000C, ADC). The mass balance, thermocouples, and gas analyzer are connected to a data logger (Multifunction Switch/Measure Unit 34980A, Agilent Technologies) and personal computer, which log all readings every two seconds. Clean sand is packed into the apparatus base until just covering the air diffuser and heater. Coarse sand (Number 12, Bell & Mackenzie Co., mean grain diameter=0.88 millimeters, coefficient of uniformity=1.6) and biosolids, mechanically mixed in three batches, are packed in the column above the base to a height of 40 centimeters in three equal lifts. This is then topped with 15 centimeters of clean sand.

Biosolids are obtained from Greenway Pollution Control Centre (Greenway) in London, Ontario, Canada. Greenway utilizes a typical wastewater treatment path, where primary clarification initially removes settleable solids (primary sludge). The waste activated sludge is settled out in secondary clarification following aerobic digestion, and is thickened in either dissolved air flotation units or rotating drum thickeners. The combined primary and waste activated sludge is dewatered via centrifugation with polymer addition, and the sampling point for all biosolids used in this study are located after this final processing step. Biosolids initial moisture content and ash content are determined according to EPA Method 1684 (U.S. EPA, 2001), to evaluate the potential quantities of ash that can be recovered following smoldering combustion.

Once the sand/biosolids mixture is emplaced in the experimental apparatus, the mixture is subjected to a uniform ignition procedure that starts with a preheating phase in which the heater is turned on, with no airflow, until the first thermocouple (2 centimeters above the heating element) reaches 200 degrees Celsius. Air injection is then initiated, achieved by a mass flow controller (FMA5400/5500 Series, Omega Ltd.) connected to laboratory compressed air at ambient temperature.

This introduction of oxygen in the air flow initiates smoldering. When a spike in temperature is recorded at the bottom-most thermocouple, the heater is turned off. Subsequent combustion is sustained by the energy released by the biosolids during upwards forward smoldering. Excluding heater inefficiency, the resistive heater provides a constant heat flux of approximately 408 W (3.4 A at 120 V). The length of the preheating phase varies between 1 and 4 hours depending on the biosolids moisture content and sand/biosolids mass ratio. The air flow is maintained until the reaction is extinguished and the entire column is cooled to ambient temperature.

Following the cooling period, the sand is removed from the experimental column and sieved to separate the coarse sand from the inorganic ash liberated from the biosolids by the smoldering reaction. The ash is characterized to evaluate the quantities of materials of value recoverable relative to the quantity of sludge smoldered.

The above experimental procedure enables the separation of inorganic materials of value from organic biosolids using a smoldering combustion method. Various modifications may be made to the foregoing without departing from the spirit and scope of the present invention. For example, while the experimental procedure described above will induce combustion front propagation in an upwards vertical direction, propagation can also proceed horizontally or in any other direction if sufficiently manipulated by the location of the ignition and the direction of air flow within the mixture.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A method for producing and collecting a gas through smoldering combustion of an organic material, the method comprising:

forming a porous mixture comprising the organic material and an added catalyst for the production of the gas;

heating at least a portion of the mixture;

forcing an oxidant through the mixture so as to initiate a self-sustaining smoldering combustion of the mixture and to cause the production of the gas, the catalyst accelerating the production of the gas and not being itself consumed during the production of the gas; and collecting the gas.

2. The method of claim 1, where the organic material is selected from the group consisting of a liquid, a slurry, a semi-solid, a solid, and mixtures thereof.

3. The method of claim 1, where the porous mixture further comprises a porous matrix.

4. The method of claim 1, where the gas is hydrogen.

5. The method of claim 1, further comprising causing propagation of the combustion away from a point of initiation of the smoldering combustion.

6. The method of claim 1, where the components of the porous mixture are aggregated in one of a reaction vessel, a pile, or a ground-level cavity.

7. The method of claim 1, further comprising continuously feeding at least one of the components of the porous mixture into a zone of smoldering combustion.

8. The method of claim 1, wherein forming the mixture comprises batch-feeding at least one of the components of the porous mixture into a vessel.

9. The method of claim 1, wherein the catalyst accelerates the production of the gas by reacting with volatile organic gases formed by combustion of the organic material.

10. A method for producing and collecting a gas through smoldering combustion of an organic material, the method comprising:

forming a porous mixture comprising the organic material and an added catalyst precursor;

heating at least a portion of the mixture;

forcing an oxidant through the mixture so as to initiate a self-sustaining smoldering combustion of the mixture and to cause the production of the gas; and collecting the gas;

wherein the catalyst precursor is converted to a catalyst for the production of the gas by the heat from the smoldering combustion, wherein the catalyst accelerates the production of the gas, and is not itself consumed during the production of the gas.

11. The method of claim 10, where the organic material is selected from the group consisting of a liquid, a slurry, a semi-solid, a solid, and mixtures thereof.

12. The method of claim 10, where the porous mixture further comprises a porous matrix.

13. The method of claim 10, where the gas is hydrogen.

14. The method of claim 10, further comprising causing propagation of the combustion away from a point of initiation of the smoldering combustion.

15. The method of claim 10, wherein the catalyst accelerates the production of the gas by reacting with volatile organic gases formed by combustion of the organic material.

* * * * *